United States Patent
Chiba et al.

(10) Patent No.: US 6,438,955 B1
(45) Date of Patent: Aug. 27, 2002

(54) MASTER CYLINDER

(75) Inventors: Shusaku Chiba; Riichirou Sugimoto, both of Higashimatsuyama (JP)

(73) Assignee: Bosch Braking Systems Co., Ltd., Tokyo (JP)

( * ) Notice: Subject to any disclaimer, the term of this patent is extended or adjusted under 35 U.S.C. 154(b) by 0 days.

(21) Appl. No.: 09/551,267

(22) Filed: Apr. 18, 2000

(30) Foreign Application Priority Data

Apr. 26, 1999 (JP) .......................................... 11-117600

(51) Int. Cl.[7] .................................................. B60T 11/28
(52) U.S. Cl. ............................................ 60/578; 60/585
(58) Field of Search .................................. 60/585, 587

(56) References Cited

U.S. PATENT DOCUMENTS

| | | | | |
|---|---|---|---|---|
| RE19,432 E | * | 1/1935 | Carroll ......................... | 60/587 |
| 4,532,768 A | * | 8/1985 | Focqueur ..................... | 60/585 |
| 4,633,669 A | * | 1/1987 | Brandemeyer et al. ....... | 60/585 |
| 4,736,768 A | * | 4/1988 | Tsubouci et al. ............ | 137/514 |
| 4,773,224 A | * | 9/1988 | Sakamoto et al. ............ | 60/585 |

FOREIGN PATENT DOCUMENTS

| | | |
|---|---|---|
| JP | 62-175250 A | 7/1987 |
| JP | 10053120 A | 2/1998 |

\* cited by examiner

*Primary Examiner*—Edward K. Look
*Assistant Examiner*—Igor Kershteyn
(74) *Attorney, Agent, or Firm*—Alston & Bird LLP

(57) ABSTRACT

The object of the present invention is to exhibit the function of a throttle valve mechanism without making the whole of a master cylinder large-sized and to simplify the structure and to reduce the number of pieces of parts. In order to attain this object, the present invention has throttle valve mechanisms with a floating valve body which sits and throttles the flow of the hydraulic fluid to the reservoir from the pressure generating chambers when the pistons operate and which opens when the pistons do not operate, and the throttle valve mechanisms are arranged in the fluid passage for the supplementation of the hydraulic fluid, and the throttle valve mechanisms have a floating valve body with a throttle passage and a valve seat with and from which the floating valve body is brought into contact and is separated, and the valve seat is provided at the tip of the connecting portions to the cylinder body of the reservoir.

10 Claims, 16 Drawing Sheets

MASTER CYLINDER

FIELD OF THE INVENTION AND RELATED ART STATEMENT

The present invention relates to a master cylinder, which is suitable for use in a clutch operating unit, a brake operating unit, or the like.

FIG. 26 is a cross sectional view showing one example of a master cylinder related to the present invention, which is disclosed in Japanese Patent Provisional Publication No. 10-53120. This master cylinder 1 has a piston 3 which is freely slidably fitted in a cylinder hole 2a formed in a cylinder body 2, and by the piston 3 and the cylinder body 2, a pressure generating chamber 4 and a hydraulic fluid waiting chamber 5 are sectioned. To the piston 3, a valve mechanism 6 and a throttle valve mechanism 7 are attached on the extension of the axis. In the valve mechanism 6, a flange 10 integrated with a rod 9 is separated from a circular member 11 to open an axial hole 12 as the piston 3 retreats to the restoration position by a return spring 8 provided in the pressure generating chamber 4, and the flange 10 comes into contact with the circular member 11 to close the axial hole 12 as the piston 3 advances from the restoration position.

Furthermore, the throttle valve mechanism 7 is equipped with a floating member 13 having a throttle hole 13a, and when there is a flow of hydraulic fluid running toward a reservoir through the axial hole 12 from the pressure generating chamber 4, it moves the floating member 13 to the throttled operating position where the throttling effect is exhibited to the flow of the hydraulic fluid, and when there is a flow of hydraulic fluid running toward the pressure generating chamber 4 through the axial hole 12 from the reservoir, it moves the floating member 13 to the unthrottled operating position where no throttling effect is exhibited to the flow of the hydraulic fluid.

Then, from the state where the valve mechanism 6 is open, the piston 3 operates, and it moves to the left in the figure and advances, so that the valve mechanism 6 may be closed, and the continuity between the pressure generating chamber 4 and the supplement passage 5 is cut off. After that, the piston 3 further moves to the left, and consequently, pressure is generated in the pressure generating chamber 4, and the hydraulic fluid is discharged from an output port 14. Until the valve mechanism 6 is closed after the start of advancing of the piston 3, the hydraulic fluid in the pressure generating chamber 4 escapes to the supplement passage 5 through the throttle valve mechanism 7 and the valve mechanism 6 by the advancing of the piston 3. By the flow of the hydraulic fluid at that moment, the floating member 13 of the throttle valve mechanism 7 closes a connecting hole 15a of a case 15. As a result of this, the hydraulic fluid in the pressure generating chamber 4 escapes to the supplement passage 5 through the throttle hole 13a of the floating member 13, so that the amount of the hydraulic fluid escaping to the supplement passage 5 from the pressure generating chamber 4 may be reduced when compared with that in the case when the flow of the hydraulic fluid escaping to the supplement passage 5 from the pressure generating chamber 4 is not throttled.

However, in the above master cylinder 1, a throttle valve mechanism 7 is provided on the extension of the axis of the piston 3, and therefore, there has been such a problem that the piston 3 becomes long, and the whole of the master cylinder 1 becomes large-sized, and the structure becomes complex, and the number of pieces of necessary parts is increased.

OBJECT AND SUMMARY OF THE INVENTION

The present invention is made due to the above problems, and it is an object thereof to provide a master cylinder, in which the function of a throttle valve mechanism can be exhibited without making the whole of the master cylinder large-sized and the structure is simple and the number of pieces of parts can be reduced.

In order to attain the above object, the present invention provides a master cylinder, in which a piston is freely slidably provided in a cylinder hole formed in the cylinder body and by the above piston and the above cylinder body, a pressure generating chamber is sectioned, and a fluid passage for connecting the pressure generating chamber and a reservoir in order to supplement the hydraulic fluid to the pressure generating chamber is provided, and the hydraulic fluid pumped in the above pressure generating chamber when the piston operates is discharged to the output port, wherein a throttle passage which throttles the flow of the hydraulic fluid to the reservoir from the pressure generating chamber when the above piston operates is formed in the fluid passage, and a throttle valve mechanism which allows the hydraulic fluid to flow to the pressure generating chamber from the reservoir by opening a valve when the fluid pressure in the pressure generating chamber becomes lower than the pressure in the reservoir is provided in the fluid passage.

Furthermore, in the present invention, the throttle valve mechanism may be constituted by having a floating valve body, and a valve seat with and from which the floating valve body is brought into contact and is separated may be provided on the connecting portion to the cylinder body of the reservoir, and a fluid passage which supplements the hydraulic fluid to the pressure generating chamber from the reservoir when the valve of the throttle valve mechanism opens may be formed in either the throttle valve mechanism or the cylinder body, and a throttle passage can be provided in the fluid passage in parallel with the floating valve body, and the throttle valve mechanism may have a ball valve which performs opening and closing by the flow of the hydraulic fluid in the fluid passage and by its own weight and a throttle passage which is formed in parallel with the ball valve, and the ball valve may have a ball-shaped floating valve body; a valve seat with and from which the floating valve body is brought into contact and is separated; a slant face continuous with the valve seat and slanted in the direction in which the floating body rises when sitting, a waiting seat where the floating valve body is waiting apart from the valve seat when not operating; and a stopper which regulates a position where the floating valve body is waiting apart from the valve seat, and it is also possible that a circular piston guide is arranged around the periphery of the piston and the fluid passage is formed in the piston guide and a throttle passage which connects the fluid passages before and after the ball valve to make a detour is provided in the above piston guide.

Furthermore, the present invention provides a master cylinder, in which a piston is freely slidably provided in a cylinder hole formed in the cylinder body and by the piston and the cylinder body, a pressure generating chamber is sectioned and a fluid passage for connecting the pressure generating chamber and reservoir in order to supplement the hydraulic fluid is provided and the hydraulic fluid pumped in the pressure generating chamber when the piston operates is discharged to the output port, wherein a circular piston guide and a seal member may be arranged around the periphery of the piston and a circular chamber communicating with the reservoir may be constituted between the piston guide and the seal member and in the circular chamber, a circular floating valve body with a throttle passage for throttling the flow of the hydraulic fluid and a seating face with which the floating valve body comes into contact may be provided.

Also, the present invention provides a master cylinder, in which a cylindrical piston is freely slidably provided in a cylinder hole formed in the cylinder body and by the piston and the cylinder body, a pressure generating chamber is sectioned and a fluid passage for connecting the pressure generating chamber and reservoir in order to supplement the hydraulic fluid is provided and the hydraulic fluid pumped in the pressure generating chamber when the piston operates is discharged to the output port, wherein the throttle valve mechanism may be provided at a position of the fluid passage pierced in the peripheral wall of the piston and the throttle valve mechanism is equipped with a throttle valve portion which is brought into contact with and is separated from the fluid passage pierced in the peripheral wall of the piston on the inside surface side of the peripheral wall and which has a throttle passage, and a support portion which is fitted in the inside surface of the piston to support the throttle valve portion, and further, the throttle valve member which integrally has the throttle valve portion and the support portion may be fixedly fitted in the piston.

In the present invention, a throttle passage which throttles the flow of the hydraulic fluid to the reservoir from the pressure generating chamber when the piston operates is formed in the fluid passage, and a throttle valve mechanism which allows the hydraulic fluid to flow to the pressure chamber from the reservoir by opening the valve when the fluid pressure in the pressure generating chamber becomes lower than the pressure in the reservoir is provided in the fluid passage, and consequently, such effects that it is possible to exhibit the function of the throttle valve mechanism without making the whole of the master cylinder large-sized and that the structure is simple and the number of pieces of parts can be reduced and the cost can be decreased are attained. Furthermore, in the present invention, effects similar to the above effects can also be obtained in such a way in which a circular piston guide and a seal member are arranged around the periphery of the piston and a circular chamber communicating with the reservoir is constituted between the piston guide and the seal member and a circular floating valve body having a throttle passage for throttling the flow of the hydraulic fluid and a seating face with which the floating valve body comes into contact are provided in the circular chamber.

Furthermore, the throttle valve mechanism is provided at a position of the fluid passage pierced in the peripheral wall of the cylindrical piston, and the throttle valve mechanism has a throttle valve portion which is brought into contact with and is separated from the fluid passage pierced in the peripheral wall of the piston on the inside surface side of the peripheral wall and which has a throttle passage and a support portion which is fitted in the inside surface of the piston to support the throttle valve portion, and as a result of this, it is also possible to attain the reduction of the number of pieces of parts, cost cutting, and improvement of assembling efficiency using a simple structure, and the length of the piston does not become long so that it may be prevented from being oversized, and further, when starting to operate, the amount of the hydraulic fluid escaping to the reservoir accompanied with the advance of the piston can be reduced, and the pedal stroke of the brake or the like can be shortened, and when returning, the supplementation of the hydraulic fluid from the reservoir to the pressure generating chamber can smoothly be performed, and an effect of making the returning response good or the like can be obtained.

DERAILED DESCRIPTION OF PREFERRED EMBODIMENTS

Figure 1:
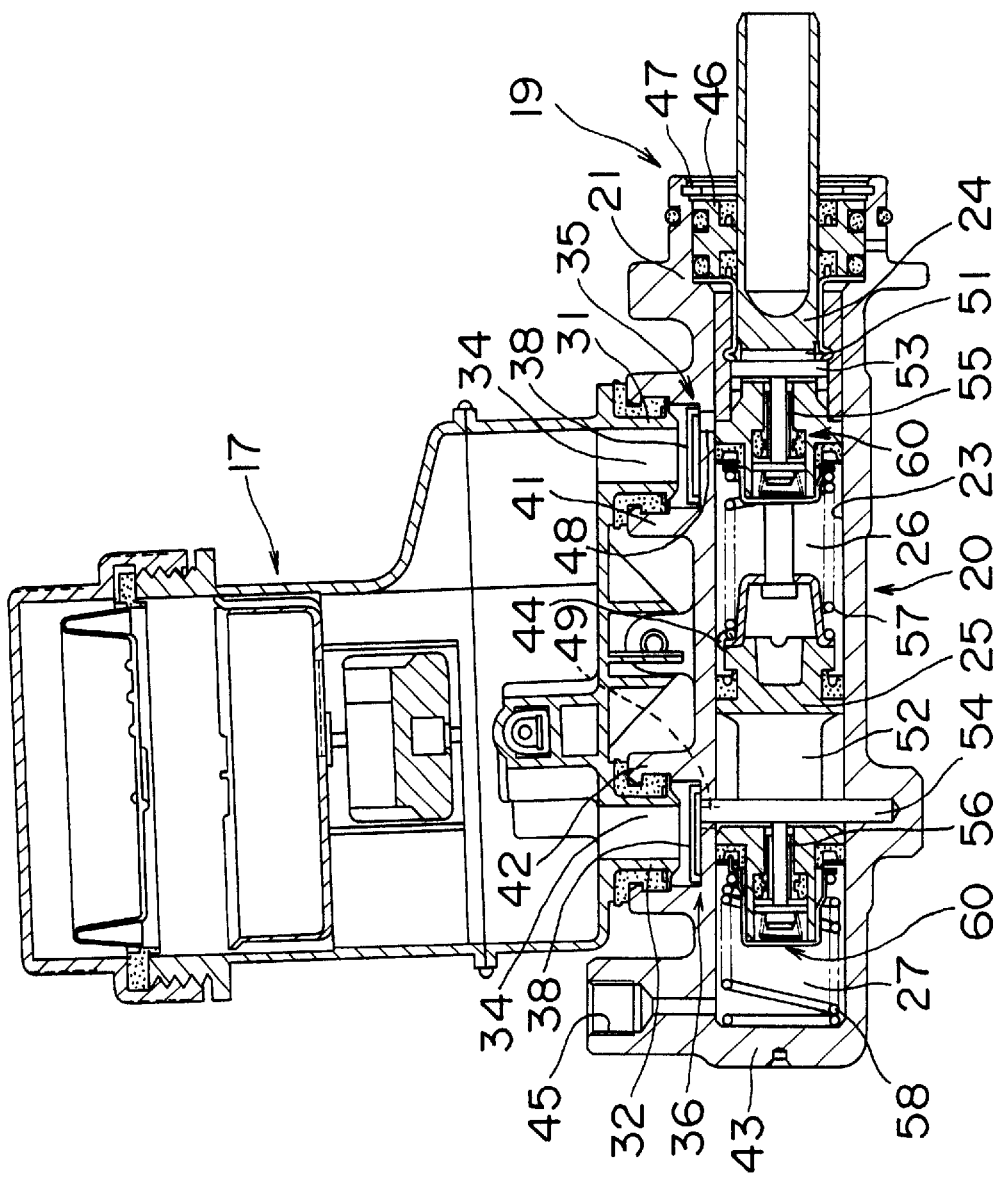
FIG. 1 is a vertical cross sectional view showing a master cylinder and a reservoir according to a first embodiment of the present invention.
Figure 2:
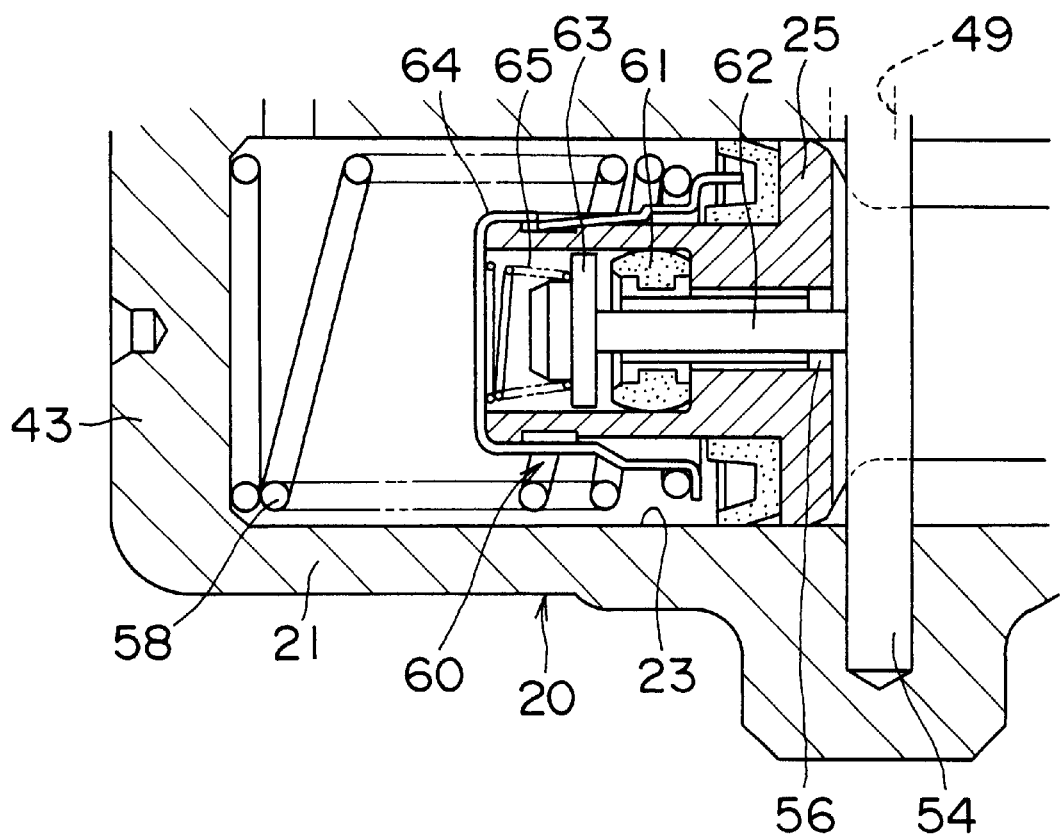
FIG. 2 is an enlarged cross sectional view of the essential portion of FIG. 1.
Figure 3:
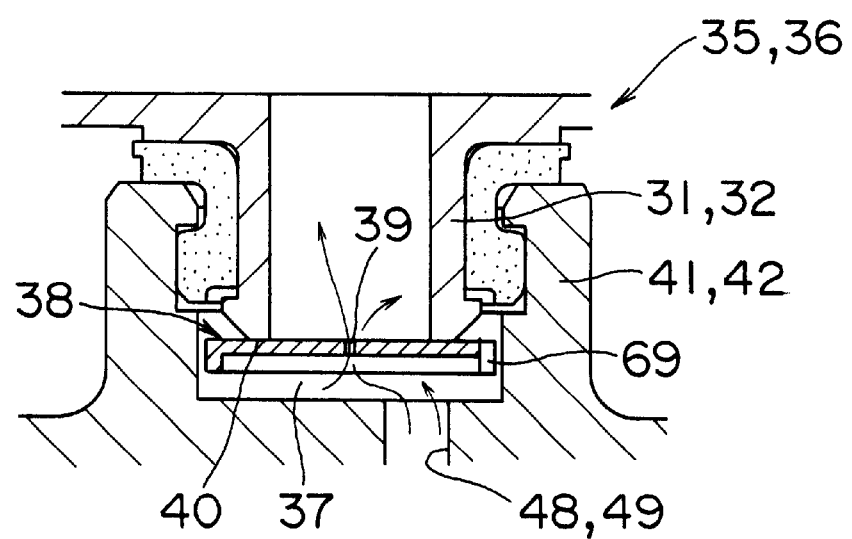
FIG. 3 is an enlarged cross sectional view of the essential portion of FIG. 1.
Figure 4:
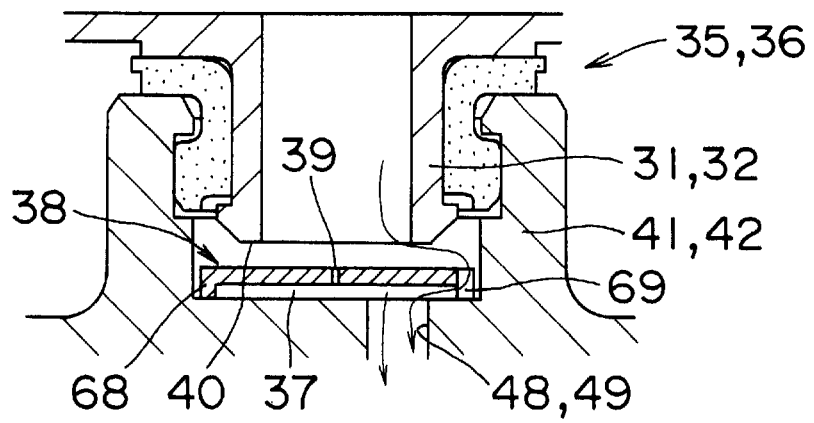
FIG. 4 is an enlarged cross sectional view of the essential portion of FIG. 1.

A master cylinder according to a first embodiment of the present invention will be described in detail by referring to drawings. FIG. 1 is a vertical cross sectional view showing a master cylinder and a reservoir according to a first embodiment of the present invention, and FIG. 2 to FIG. 4 are enlarged cross sectional views of the essential parts thereof. This master cylinder 19 has a primary piston 24 and a secondary piston 25 which are freely slidably inserted into a cylinder hole 23 formed in a cylinder main body 21 of a cylinder body 20, and between the primary piston 24 and the secondary piston 25, a primary pressure generating chamber 26 is sectioned, and on the outer end side of the secondary piston 25, a secondary pressure generating chamber 27 is sectioned.

Then, in the master cylinder 19, throttle valve mechanisms 35, 36 having a floating valve body 38 which sits and throttles the flow of the hydraulic fluid to the reservoir 17 from the pressure generating chamber 26 when a piston 24 operates and which opens when the piston 24 does not operate are provided, and the throttle valve mechanisms 35, 36 are arranged in fluid passages 34, 34 for the supplementation of the hydraulic fluid, and to the throttle valve mechanisms 35, 36, a floating valve body 38 having a throttle passage 39 of a small hole and a valve seat 40 with and from which the floating valve body 38 is brought into contact and is separated are provided, and the valve seat 40 is provided at the tips of connecting portions 31, 32 to the cylinder body 20 of the reservoir 17.

The cylinder body 20 has two cylindrical connection receiving portions 41, 42 projecting upward and an end wall 43 closing the end portion of the cylinder hole 23 which are integral with the cylinder main body 21, and it is equipped with output ports 44, 45 corresponding to the respective pressure generating chambers 26, 27, and on one end side where the cylinder hole 23 is open, a plug 46 is fluid-tightly fixedly fitted and is prevented from being slipped off by a snap ring 47, and in the respective connection receiving portions 41, 42, the connecting portions 31, 32 of the reservoir 17 are fitted. Furthermore, in the cylinder body 20, fluid passages 48, 49 in the radial direction are pierced, which are open to the inside surface of the peripheral wall of the corresponding pressure generating chambers 26, 27 and communicate with the connecting portions 31, 32 of the reservoir 17.

The primary piston 24 and the secondary piston 25 have slits 51, 52 along the axial direction, and pins 53, 54 fixedly provided along the direction of the diameter to the cylinder body 20 are passing through the respective slits 51, 52, and in the center of the tips before the slits 51, 52, fluid passages 55, 56 are pierced. Furthermore, the primary piston 24 and the secondary piston 25 are urged to the right in FIG. 1 by a return spring 57 arranged between these pistons and a return spring 58 arranged between the secondary piston 25 and the end wall 43 of the cylinder body 20.

At the tip of each of the pistons 24, 25, a center valve 60 is provided. Since this center valve 60 is the same for each of the pistons 24, 25, only one valve will be described. As shown in FIG. 2, the center valve 60 is equipped with a circular valve seat member 61 which is fixedly fitted to the piston 25 and is made from an elastic material, a flange-like valve body 63 which integrally has a rod 62, and a conical spring 65 which is arranged between a retainer 64 fixed to the tip of the piston 25 and the flange-like valve body 63, and the conical spring 65 urges the flange-like valve body 63 in the direction of seating that on the valve seat member 61. In the flange-like valve body 63, the rod 62 passes through the valve seat member 61 and the fluid passage 56, and the rear end of the rod 62 is brought into contact with and separated from the pin 54.

The primary pressure generating chamber 26 can communicate with the oil reservoir 17 through the fluid passage 55 at the tip of the piston 24, the fluid passage 48 formed in the cylinder body 20, the throttle valve mechanism 35, and the connecting portion 31 of the reservoir 17. The secondary pressure generating chamber 27 can communicate with the reservoir 17 through the fluid passage 56 at the tip of the piston 25, the fluid passage 49 formed in the cylinder body 20, the throttle valve mechanism 36, and the connecting portion 32. Furthermore, both pressure generating chambers 26, 27 communicate with the unillustrated wheel cylinders of the front and rear wheels through the respectively corresponding output ports 44, 45 pierced in the cylinder main body 21.

Figure 5:
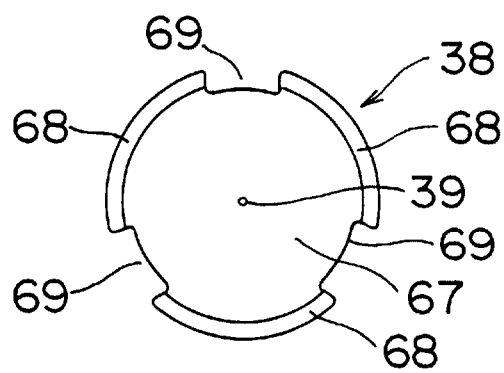
FIG. 5 is a bottom view showing a floating valve body used in a master cylinder according to a first embodiment of the present invention.

As shown in FIG. 3 and FIG. 4, the throttle valve mechanisms 35, 36 are constituted such that they are equipped with the valve seats 40 formed at the tips of the connecting portions 31, 32 and the valve chambers 37 sectioned by the connecting portions 31, 32 in the respective connection receiving portions 41, 42 and that they contain the floating valve bodies 38 in the valve chambers 37. As shown in FIG. 5, the floating valve body 38 has a discoid valve main body 67 in which a throttle passage 39 of a small hole is pierced in the center and three ribs 68 which are formed downward at equal angular intervals along the periphery of the discoid valve main body 67, and between the adjacent ribs 68, 68, a notch-like fluid passage 69 is formed.

Figure 6:
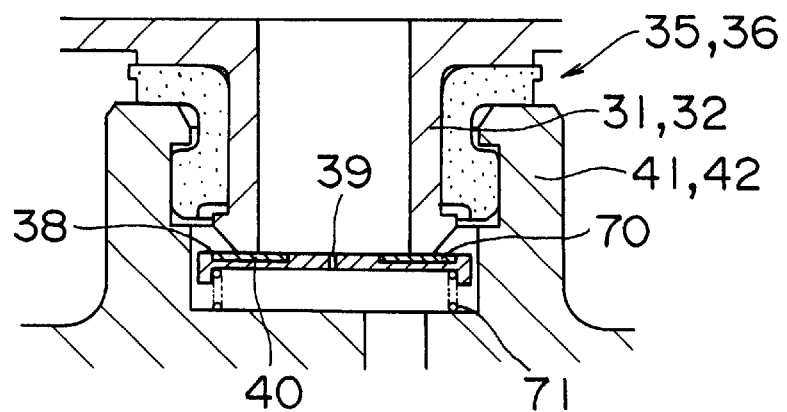
FIG. 6 is a cross sectional view of the essential portion showing a modified example of a floating valve body used in a master cylinder according to a first embodiment of the present invention.

Then, in the throttle valve mechanism 35, when there is a flow of the hydraulic fluid to the reservoir 17 from the pressure generating chamber 26, the floating valve body 38 rises up by the flow of the hydraulic fluid to come into contact with the valve seat 40, and a valve closing state is made, and the mechanism 35 operates so that the hydraulic fluid may flow upward only through the throttle passage 39. On the contrary, when there is a flow of the hydraulic fluid to the pressure generating chamber 26 from the reservoir 17, the floating valve body 38 falls down by the flow of the hydraulic fluid and its own weight to be separated from the valve seat 40, and a valve opening state is made, and the mechanism 35 operates so that the hydraulic fluid in the reservoir 17 may flow downward through the fluid passage 69 around the periphery of the floating valve mechanism 38. Since the operation of the other throttle valve mechanism 36 is similar, the description will be omitted. By the way, it is also possible that as shown in FIG. 6, the floating valve body 38 is a valve body in which an elastic seal member 70 is stuck to the upper surface and a small urging force is given upward by a compression spring 71.

The operation of a master cylinder according to the above first embodiment of the present invention will be described by mainly referring to the primary side, and the description will be omitted as for the secondary side where the operation is similar to this. In the unoperating state shown in FIG. 1, in the piston 24, the leftmost inside surface of the slit 51 and the rear end of the rod 62 are brought into contact with the pin 53, and the center valve 60 and the throttle valve mechanism 35 are in the opening state. When the piston 24 operates and advances to the left from this state, the valve seat member 61 also advances together with the piston 24, and the center valve 60 is closed. When the piston 24 further advances, the pressure in the pressure generating chamber 26 rises, and the hydraulic fluid is sent out of the output port 44. In the above operation, during the time from the opening to the closing of the center valve 60, the hydraulic fluid in the pressure generating chamber 26 flows to the valve chamber 37 of the throttle valve mechanism 35 through the center valve 60 because of the advance of the piston 24. By the flow of the hydraulic fluid at this moment, the floating valve body 38 of the throttle valve mechanism 35 rises up to come into contact with the valve seat 40. By this contact, the hydraulic fluid in the pressure generating chamber 26 is restored to the reservoir 17 only through the throttle passage 39, but the amount of the hydraulic fluid of this restoration is very small.

When the operation of the piston 24 is released, the piston 24 retreats by the urging force of the spring 57, and when the rod 62 comes into contact with the pin 54 or when the pressure in the pressure generating chamber 26 becomes lower than the pressure in the reservoir 17, the center valve 60 opens, and the pressure generating chamber 26 communicates with the reservoir 17. At this moment, the floating valve body 38 of the throttle valve mechanism 35 is separated from the valve seat 40, and the hydraulic fluid flows to be supplemented to the pressure generating chamber 26 from the reservoir 17 only with a small resistance. Furthermore, in a vehicle equipped with a traction control mechanism or the like, the throttle valve mechanism 35 also opens in the case where it is necessary to rapidly supplement the hydraulic fluid to a wheel cylinder through the master cylinder 19 from the reservoir 17.

By using the master cylinder 19 according to the above first embodiment of the present invention, there are such advantages that the valve seat 40 is formed at the tips of the connecting portions 31, 32 of the reservoir 17 and the discoid floating valve body 38 is provided in the connection receiving portions 41, 42 of the cylinder body 20 so that the function of the throttle valve mechanisms 35, 36 can be exhibited without making the whole of the master cylinder 19 large-sized, and that the structure is simple so that the number of pieces of parts can be reduced.

Figure 7:
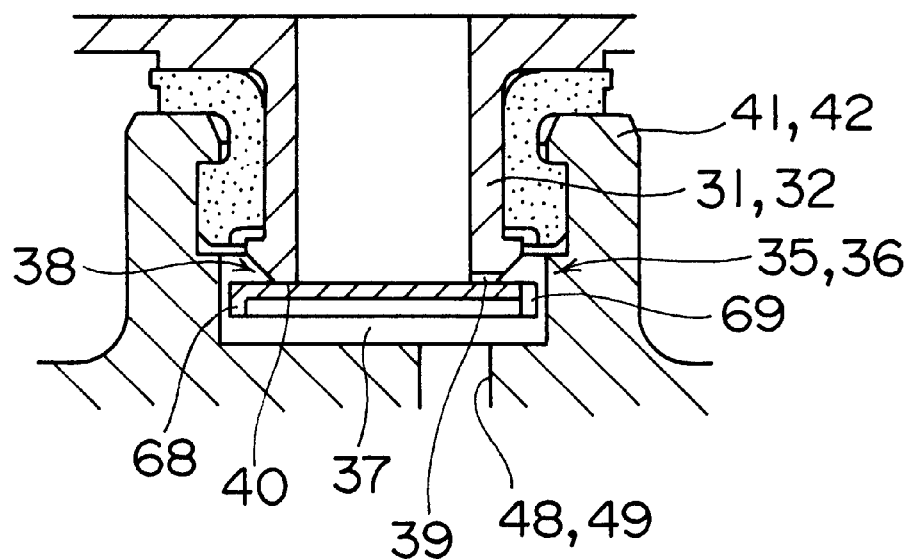
FIG. 7 is a partial cross sectional view showing the essential portion of a first modified example of a throttle valve mechanism according to a first embodiment of the present invention.
Figure 8:
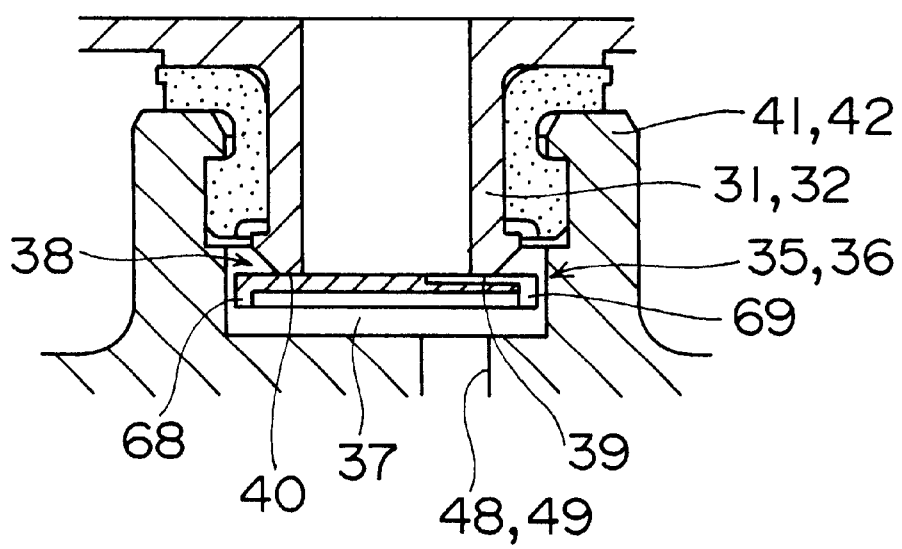
FIG. 8 is a partial cross sectional view showing another essential portion of a first modified example of a throttle valve mechanism according to a first embodiment of the present invention.

FIG. 7 is a partial cross sectional view showing the essential part of a first modified example of a throttle valve mechanism according to the above first embodiment, and the same reference numerals are given to the same parts as shown in FIG. 3 and FIG. 4, and the repeated description will be omitted. In the throttle valve mechanisms 35, 36 in the case of this modified example, a radial groove in the radial direction is provided in the surface of the valve seat 40 formed at the tips of the connecting portions 31, 32, and this radial groove is made throttle passage 39. As for this radial groove, it is also possible, as shown in FIG. 8, that the radial groove provided in the floating valve body 38 is made the throttle passages 39 instead of the groove provided in the surface of the valve seat 40.

In this modified example, when there is a flow of the hydraulic fluid to the reservoir 17 from the pressure generating chambers 26, 27, the floating valve body 38 comes into contact with the valve seat 40 by that flow, and the hydraulic fluid in the pressure generating chambers 26, 27 flows to the reservoir 17 only through the throttle passage 39 made of the radial groove of the floating valve body 38. Accordingly, when starting to operate, the amount of the hydraulic fluid escaping to the reservoir 17 from the pressure generating chambers 26, 27 can be reduced. On the contrary, when there is a flow of the hydraulic fluid to the pressure generating chambers 26, 27 from the reservoir 17, the floating valve body 38 is separated from the valve seat 40 by that flow and by its own weight, and the hydraulic fluid in the reservoir 17 flows to the pressure generating chambers 26, 27 through the clearance between the valve seat 40 and the floating valve body 38, the outside of the floating valve body 38. Accordingly, when returning, the hydraulic fluid in the reservoir 17 can be supplemented to the pressure generating chambers 26, 27 without resistance.

Figure 9:
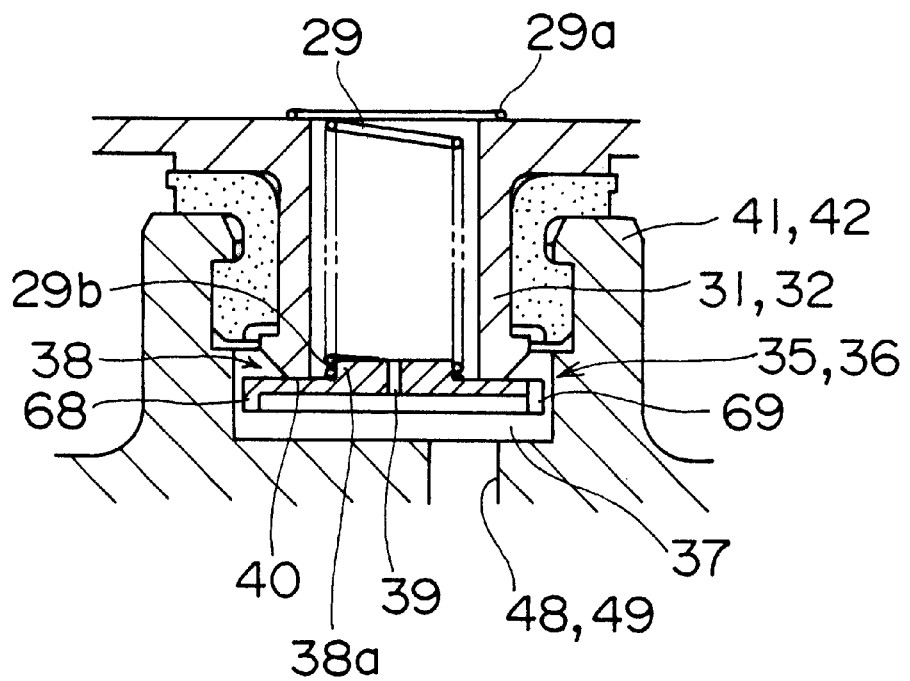
FIG. 9 is a partial cross sectional view showing the essential portion of a second modified example of a throttle valve mechanism according to a first embodiment of the present invention.
Figure 10:
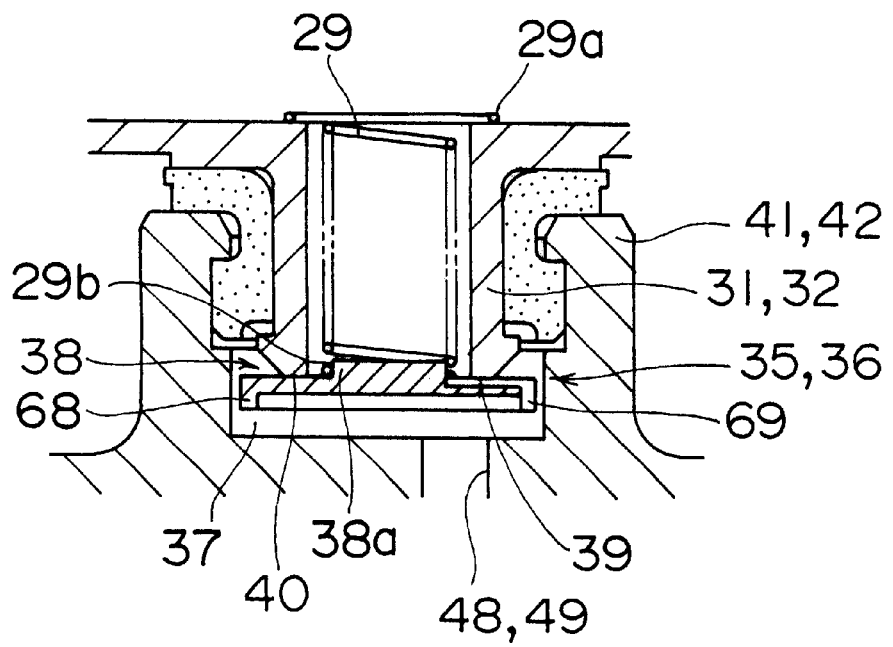
FIG. 10 is a partial cross sectional view showing another essential portion of a second modified example of a throttle valve mechanism according to a first embodiment of the present invention.
Figure 11:
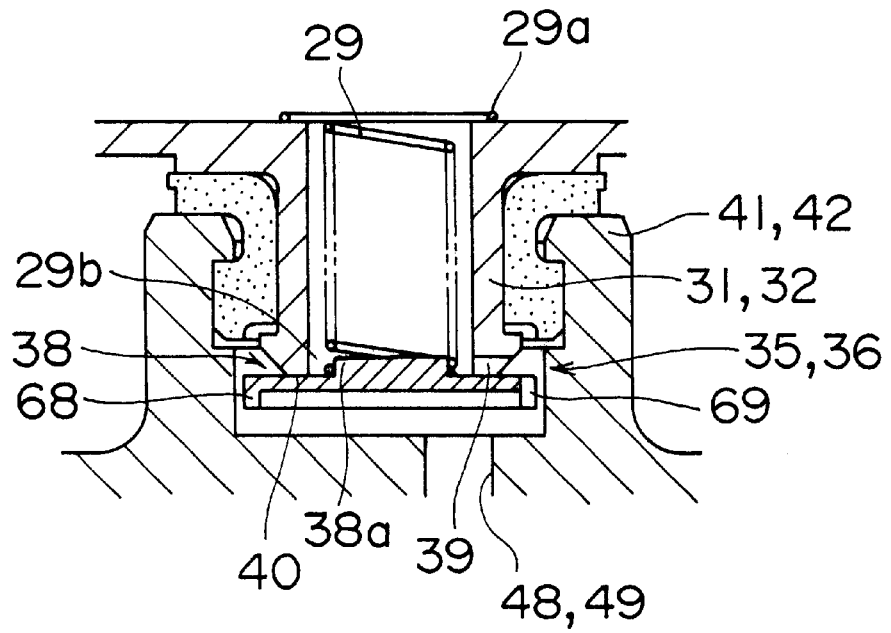
FIG. 11 is a partial cross sectional view showing still another essential portion of a second modified example of a throttle valve mechanism according to a first embodiment of the present invention.

FIG. 9 is a partial cross sectional view showing the essential part of a second modified example of a throttle valve mechanism according to the above first embodiment. In this modified example, in the floating valve body 38, an upward projection 38a is projectingly provided at the center, and a throttle passage 39 shaped like a small hole which penetrates a part of this projection 38a is pierced, and the upward projection 38a is pressed into the lower end portion 29b of a tension spring 29 whose upper end portion 29a with a large outside diameter is engaged. The tension spring 29 exists in the connecting portions 31, 32 of the reservoir 17, and it is a spring for floating the floating valve body 38 in the hydraulic fluid, and by this, the sitting of the floating valve body 38 is more surely performed. In this case, it is also possible, as shown in FIG. 10, that a radial groove in the radial direction is provided in the surface of the valve seat 40 formed at the tips of the connecting portions 31, 32 to be the throttle passage 39 instead of the throttle passage 39 shaped like a small hole which is pierced in the floating valve body, and it is also possible, as shown in FIG. 11, that the radial groove provided in the floating valve body 38 is made the throttle passage 39. The operation of the second modified example is approximately similar to that of the first modified example.

Figure 12:
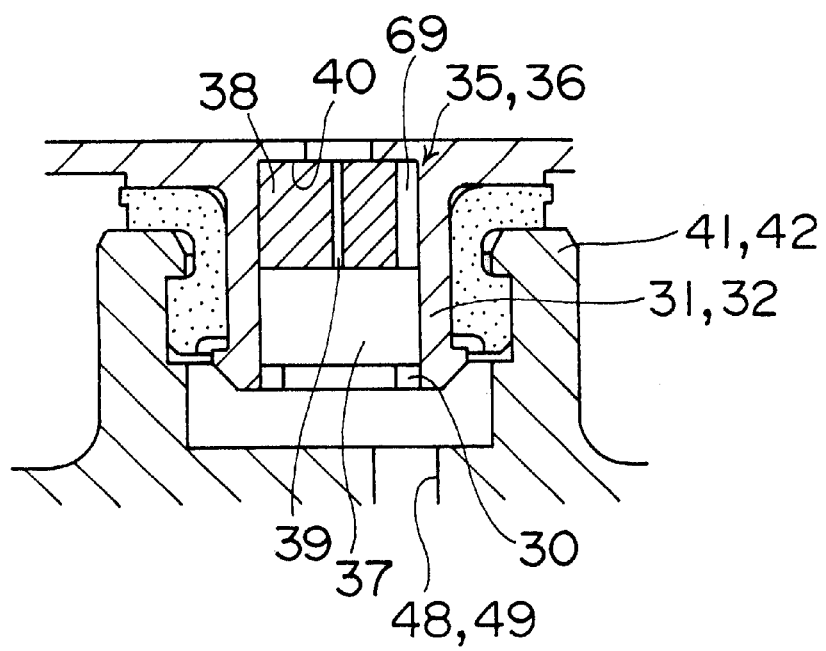
FIG. 12 is a partial cross sectional view showing the essential portion of a third modified example of a throttle valve mechanism according to a first embodiment of the present invention.
Figure 13:
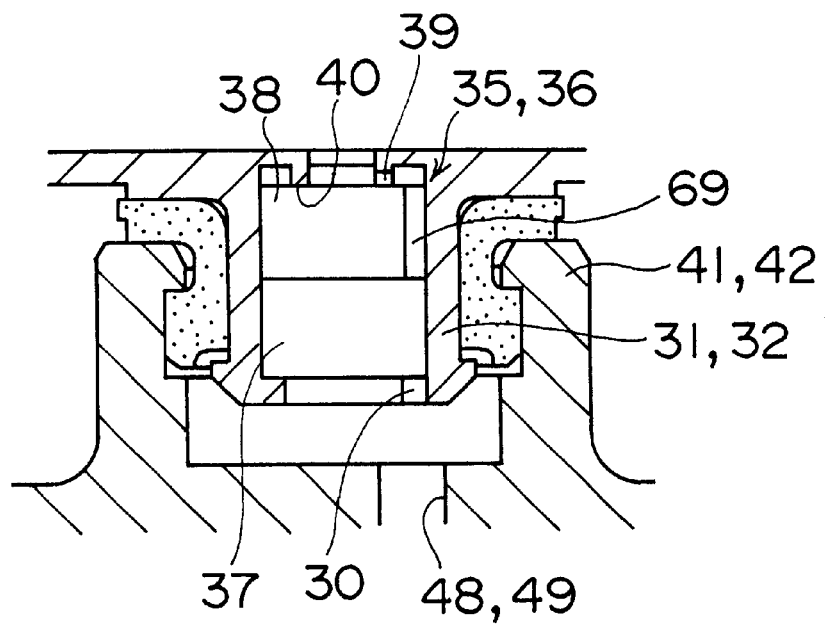
FIG. 13 is a partial cross sectional view showing another essential portion of a third modified example of a throttle valve mechanism according to a first embodiment of the present invention.
Figure 14:
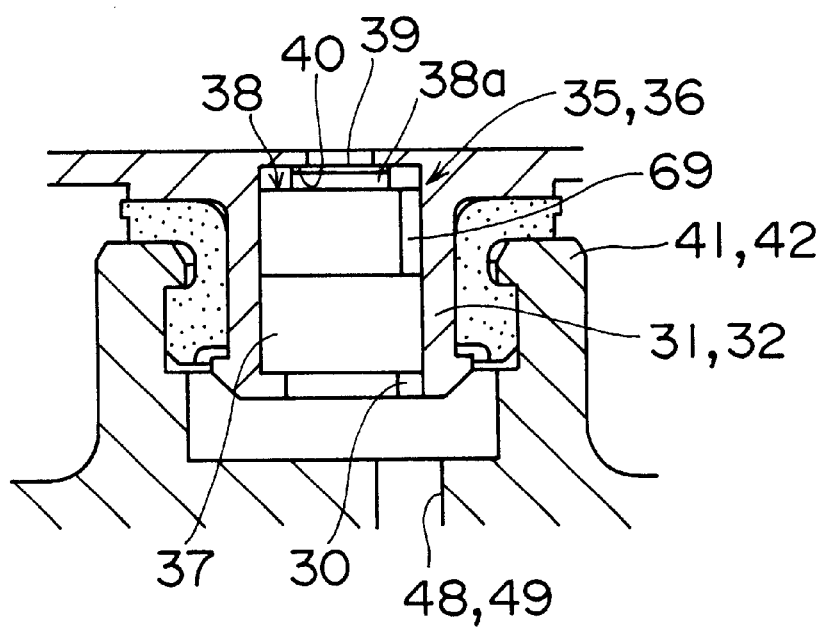
FIG. 14 is a partial cross sectional view showing still another essential portion of a third modified example of a throttle valve mechanism according to a first embodiment of the present invention.
Figure 15:
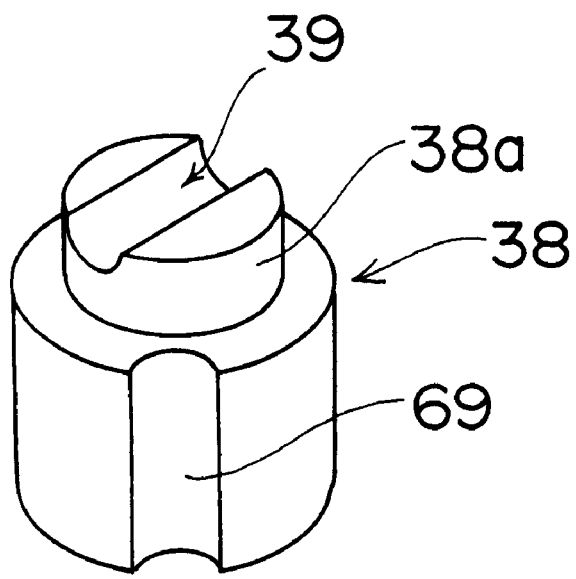
FIG. 15 is an illustration showing the enlarged floating valve body of FIG. 14.

FIG. 12 is a partial cross sectional view showing the essential part of a third modified example of a throttle valve mechanism according to the above first embodiment. In this modified example, the valve seat 40 is formed in the connecting portions 31, 32, and the floating valve body 38 is arranged in a way in which rising and falling are free. The floating valve body 38 is shaped like a short column, and in the center, a throttle passage 39 shaped like a small hole is pierced, and a notch-shaped fluid passage 69 which is continuous along the generating line exists in the peripheral surface, and the interior of the connecting portions 31, 32 is made the valve chamber 37, and the valve body 38 is floating to freely come into contact with and to freely be separated from the valve seat 40 formed at the upper end thereof. At the lower end of the interior of the connecting portions 31, 32, a slipping-off preventing member 30 is fixed. In the case of this third modified example, it is also possible, as shown in FIG. 13, that a notch is provided in the circular valve seat 40 projectingly provided downward in the valve chamber 37 of the connecting portions 31, 32 so that this notch may be the throttle passage 39 instead of the throttle passage 39 shaped like a small hole, and it is also possible, as shown in FIG. 14 and FIG. 15, that an upward projection 38a is provided at the center of the floating valve body 38 so that the diametral groove provided in this upward projection 38a may be the throttle passage 39. The operation of the third modified example is approximately similar to that of the first modified example.

Figure 16:
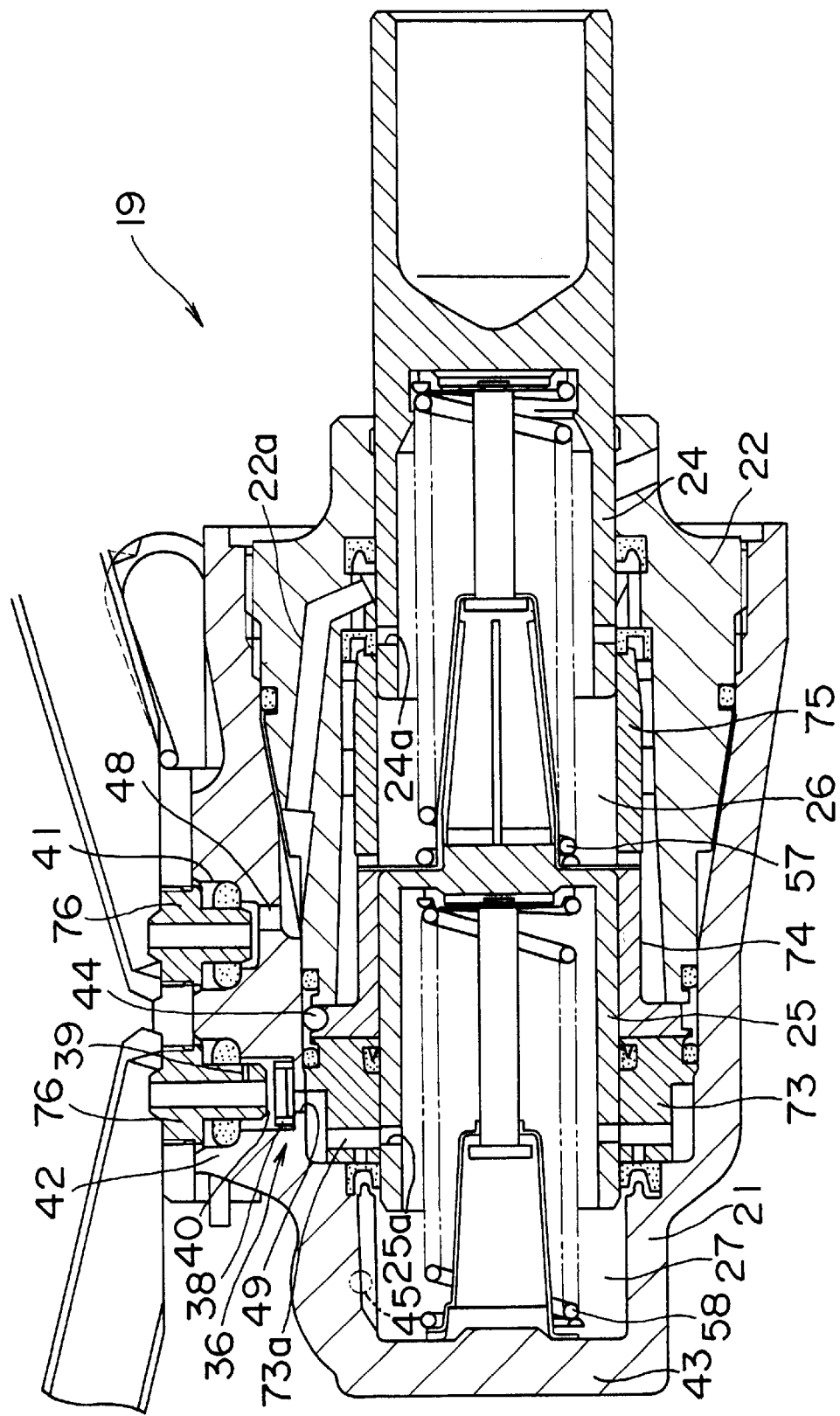
FIG. 16 is a vertical cross sectional view showing a master cylinder according to a second embodiment of the present invention.

FIG. 16 is a vertical cross sectional view showing a master cylinder according to a second embodiment of the present invention. The cylinder body 20 of this master cylinder 19 comprises a cylinder main body 21 and a cap 22 assembled thereto, and the cylinder main body 21 has two connection receiving portions 41, 42, and in the peripheral wall of the cap 22, a slant connecting hole 22a is pierced. In the cylinder main body 21, a piston guide 73 and a sleeve 74 with a flange are fixedly fitted, and in the cap 22, a sleeve 75 is fixedly fitted.

In this master cylinder 19, a primary piston 24 is freely slidably fitted in the sleeve 75 and a secondary piston 25 is freely slidably fitted in the piston guide 73 and the sleeve 74 with a flange, and by both these pistons 24, 25, a primary pressure generating chamber 26 and a secondary pressure generating chamber 27 are formed. The throttle valve mechanism 36 in this case has a floating valve body 38 with no throttle passage, and a throttle passage 39 shaped like a small hole is pierced along the radial direction of a connector 76 screwed in the connection receiving portion 42, and to the connector 76, a valve seat 40 similarly to that in the case of the above connecting portions 31, 32 is formed.

The primary piston 24 and the secondary piston 25 are shaped like a cylinder with a bottom, and in those peripheral walls, small holes 24a, 25a are pierced. Furthermore, both pistons 24, 25 are urged to the right in the figure by a return spring 57 arranged between them and a return spring 58 arranged between that and the end wall 43 of the cylinder main body 21.

The primary pressure generating chamber 26 can communicate with one connection receiving portion 41 through a small hole 24a pierced in the primary piston 24, a connecting hole 22a pierced in the cap 22, and a fluid passage 48 of the cylinder main body 21. The secondary pressure generating chamber 27 can communicate with the other connection receiving portion 42 through a small hole 25a pierced in the secondary piston 25, a fluid passage 73a pierced in the piston guide 73, and a fluid passage 49 of the cylinder main body 21. Furthermore, both pressure generating chambers 26, 27 can communicate with unillustrated wheel cylinders of the front and rear wheels through output ports 44, 45 pierced in the cylinder main body 21. In the case of a master cylinder 19 according to the second embodiment, when the floating valve body 38 is closed, the hydraulic fluid in the secondary pressure generating chamber 27 is restored to the reservoir 17 through the throttle passage 39 of the connector 76.

Figure 17:
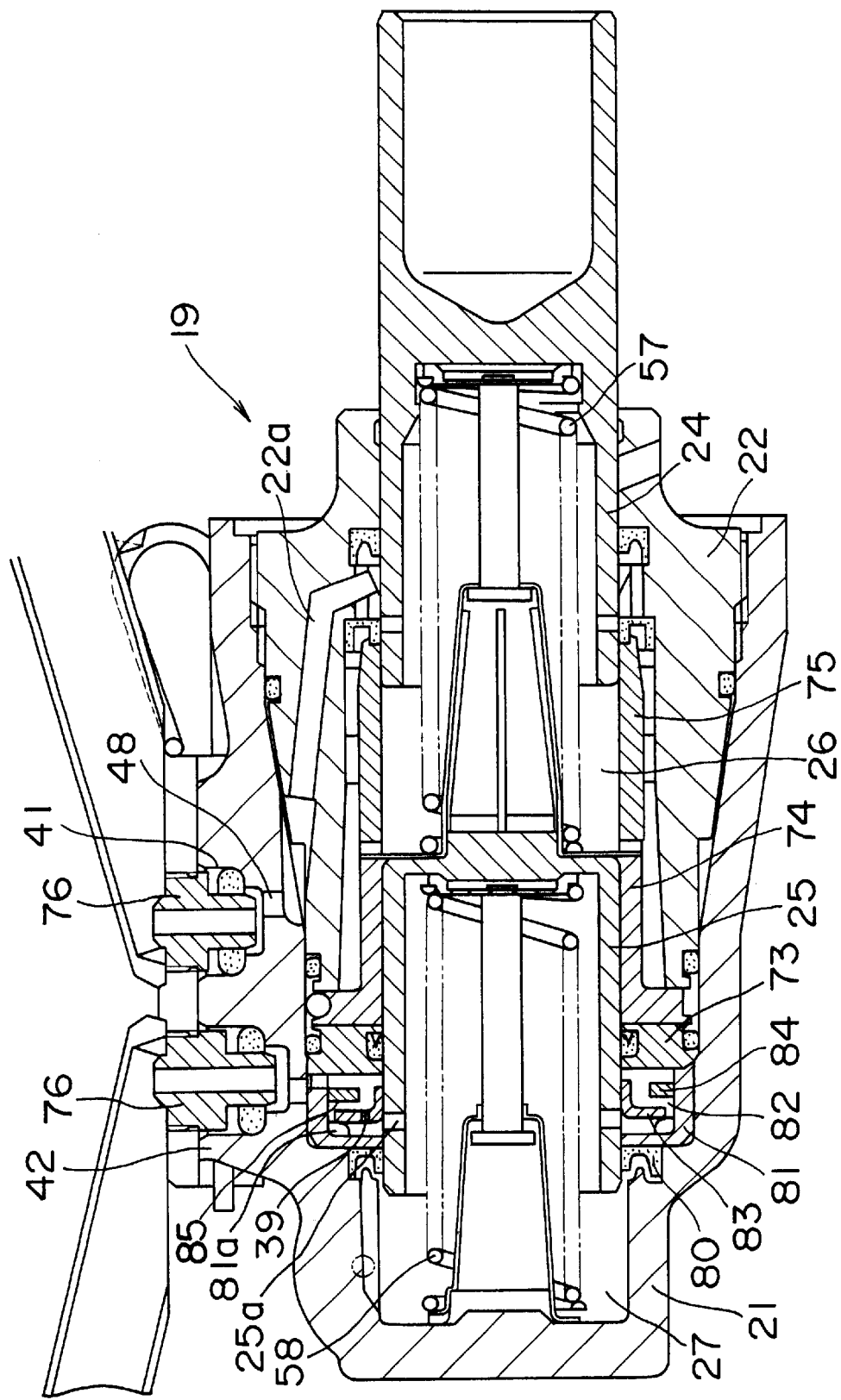
FIG. 17 is a vertical cross sectional view showing a master cylinder according to a third embodiment of the present invention.

FIG. 17 is a vertical cross sectional view showing a master cylinder according to a third embodiment of the present invention, and the same reference numerals are given to the same parts as in FIG. 16. In this master cylinder 19, a circular piston guide 73 and a seal member 80 are arranged around the periphery of the secondary piston 25, and between the piston guide 73 and the seal member 80, a retainer member 81 is provided.

Furthermore, the master cylinder 19 is constituted such that a circular chamber 82 which can communicate with the reservoir 17 is provided outside the secondary piston 25 and between the piston guide 73 and the seal member 80, and in the circular chamber 82 and around the periphery of the secondary piston 25, a circular floating valve body 83 which is fluid-tightly slidable and has a throttle passage 39 is arranged inside the retainer member 81 and a seat member 84 is fixed inside the retainer member 81.

The operation of a master cylinder according to the above third embodiment will be described. In the case where there is a flow of the hydraulic fluid to the reservoir 17 from the secondary pressure generating chamber 27, the floating valve body 83 is brought into contact with the seating face 85 of the seat member 84 by that flow, and the flow of the hydraulic fluid to the reservoir 17 is performed only through the throttle passage 39 of the floating valve body 83. Accordingly, when starting to operate, the amount of the hydraulic fluid in the secondary pressure generating chamber 27 escaping to the reservoir 17 is small.

On the contrary, in the case where there is a flow of the hydraulic fluid to the secondary pressure generating chamber 27 from the reservoir 17, the floating valve body 83 is separated from the seating face 85 of the seat member 84 by that flow, and it comes into contact with stopper portions 81a projectingly provided at a plurality of places in the circumferential direction of the end plate portion of the retainer member 81. By this contact, the hydraulic fluid from the reservoir 17 is supplied to the secondary pressure generating chamber 27 through a clearance between the floating valve body 83 and the seat member 84, the outside of the floating valve body 83, a clearance between the floating valve body 83 and the retainer member 81, and a small hole 25a of the piston 25. Accordingly, when returning, the hydraulic fluid is supplied to the secondary pressure generating chamber 27 from the reservoir 17 without resistance.

Figure 18:
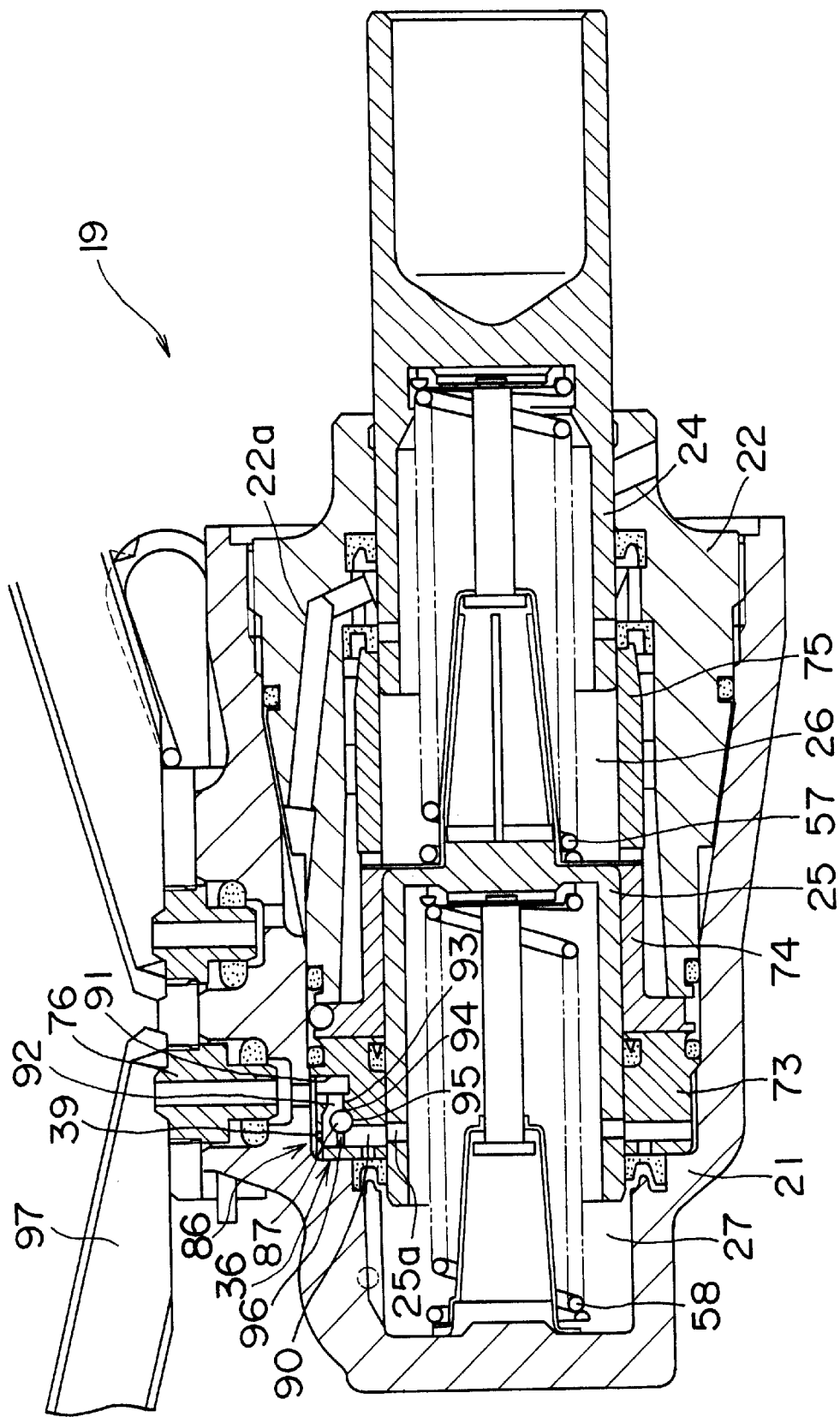
FIG. 18 is a vertical cross sectional view showing a master cylinder according to a fourth embodiment of the present invention.

FIG. 18 is a vertical cross sectional view showing a master cylinder according to a fourth embodiment of the present invention. This master cylinder 19 is provided such that a circular piston guide 73 is arranged around the periphery of the piston 25 and a fluid passage for the supplementation of the hydraulic fluid is formed in the piston guide 73 and a ball valve 86 with a ball-shaped floating valve body 87 is employed for the throttle valve mechanism 36 in the fluid passage and a throttle passage 39 which connects the fluid passages for the supplementation of the hydraulic fluid before and after the ball valve 86 to make a detour is formed along the radial direction in the peripheral wall of the piston guide 73.

The piston guide 73 has radial passages 90, 91 at 2 places and a rectangular passage 92 continuous at right angles thereto as the fluid passage for the supplementation of the hydraulic fluid, and in one part of the periphery, a clearance communicating with the connecting portion 32 is formed, and a ball valve 86 which performs the opening and closing by the flow of the hydraulic fluid in the fluid passage 34 for the supplementation of the hydraulic fluid and by gravity is arranged, and a throttle passage 39 which connects the clearance of the periphery and the rectangular passage 92 is pierced in the peripheral wall in parallel with the ball valve 86.

The ball valve 86 comprises a ball-shaped floating valve body 87 arranged in the rectangular passage 92, a valve seat 93 which exists in the rectangular passage 92 and with and from which the floating valve body 87 is brought into contact and is separated, a slant surface 94 continuous with the valve seat 93 and slant in the direction in which the floating valve body 87 rises when sitting, a waiting seat 95 where the floating valve body 87 is waiting apart from the valve seat 93 when not operating, and a stopper 96 which regulates the position where the. floating valve body 87 is waiting apart from the valve seat 93. The rectangular passage 92 in the position of the waiting seat 95 is set to have a size so that the floating valve body 87 may not flow out to the reservoir 17 side. The number of throttle valve mechanisms 36 is not limited to a singular number, and they may be provided at a plurality of places in the circumferential direction of the piston guide 73, and it is also possible to provide a groove along the rectangular passage 92 or a hole instead of the throttle passage 39 formed along the radial direction in the peripheral wall of the piston guide 73.

In the operation of this master cylinder 19, when not operating, the ball-shaped floating valve body 87 is positioned at the waiting seat 95, and the secondary pressure generating chamber 27 communicates with the unillustrated reservoir 17 through a small hole 25a of the piston 25, the fluid passage for the supplementation of the hydraulic fluid in the piston guide 73 and the peripheral clearance thereof or the like, the connection receiving portion 42, the connector 76, and the duct 97. When there is a flow to the reservoir 17 from the secondary pressure generating chamber 27, the floating valve body 87 rises up the slant surface 94 to sit by that flow, and the flow of the rectangular passage 92 is cut off. Accordingly, the hydraulic fluid in the secondary pressure generating chamber 27 is sent to the reservoir 17 only through the throttle passage 39, and therefore, the amount of the hydraulic fluid escaping to the reservoir 17 from the pressure generating chamber 27 when the piston 25 advances at the time of the operation start is small.

On the contrary, when there is a flow to the pressure generating chamber 27 from the reservoir 17, the floating valve body 87 exists in the position where it is brought into contact with the stopper 96, by that flow and the own weight of the floating valve body 87. Accordingly, the hydraulic fluid is supplied to the pressure generating chamber 27 through the fluid passage for the supplementation of the hydraulic fluid in the piston guide 73.

Figure 19:
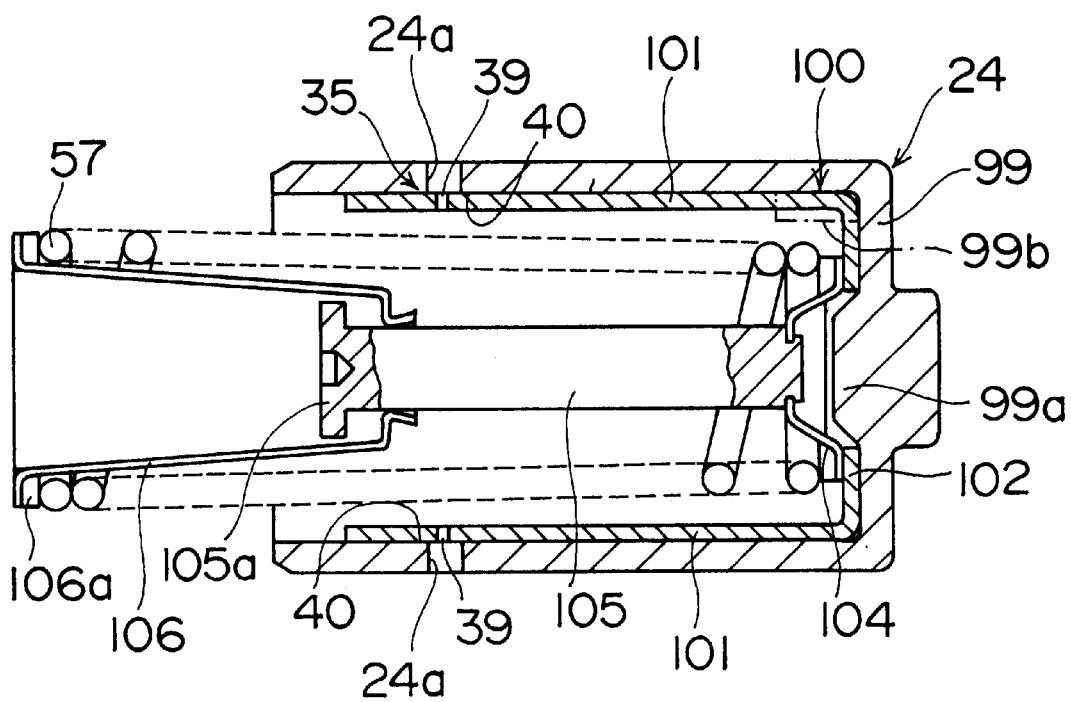
FIG. 19 is a vertical cross sectional view showing the essential portion of a throttle valve mechanism of a master cylinder according to a fifth embodiment of the present invention.
Figure 20:
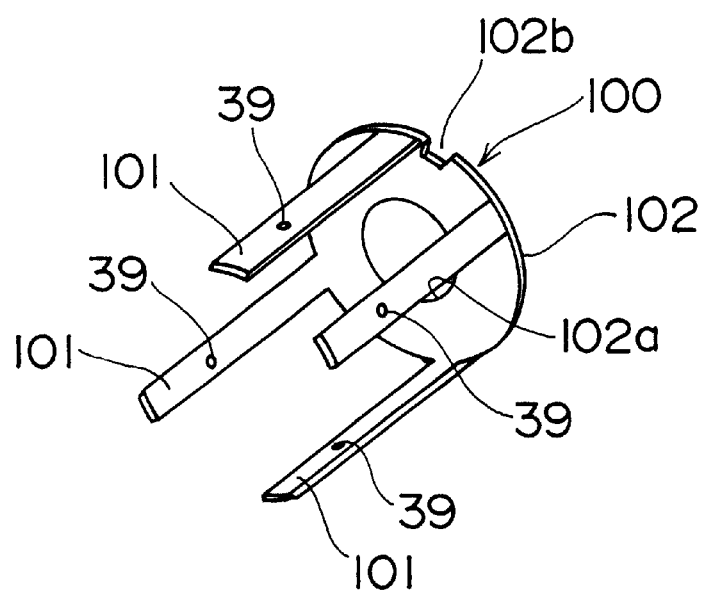
FIG. 20 is an illustration showing a throttle valve member of FIG. 19.

FIG. 19 is a vertical cross sectional view showing a throttle valve mechanism of a master cylinder according to a fifth embodiment of the present invention, and it shows only the secondary piston, and the throttle valve mechanism of the primary piston will be omitted since it is similar to this. In this master cylinder, a throttle valve mechanism 35 is provided at a position of a hole-shaped fluid passage 24a pierced in the peripheral wall of the cylindrical piston 24 with a bottom, and the throttle valve mechanism 35 has a throttle valve member 100 comprising a throttle valve portion 101 which is brought into contact with and is separated from the fluid passage 24a pierced in the peripheral wall of the piston 24 on the inside surface side of the peripheral wall and which has a throttle passage 39 shaped like a small hole, and a support portion 102 which is fitted in the inside surface of the piston 24 to support the throttle valve portion 101.

In the piston 24, holes to be the fluid passage 24a are pierced in 4 places of the peripheral wall at equal angular intervals, and the periphery on the inside surface side of this fluid passage 24a is made the valve seat 40, and it has a truncated conical projection 99a formed in the center of the end wall 99 and a trapezoidal projection 99b for the positioning formed at the boundary part between the peripheral wall and the end wall 99. Then, in the piston 24, a throttle valve member 100 and a fixed retainer 104 brought into contact with the support portion 102 thereof are inserted into the interior. To the fixed retainer 104, a pin 105 is coupled, and a return spring 57 is arranged between the flange 106a of the movable retainer 106 which is prevented from slipping off by the head portion 105a of the pin 105 and the fixed retainer 104.

The throttle valve member 100 is made from an elastic metal material or a synthetic resin material, and it integrally has 4 pieces of throttle valve portions 101 corresponding to 4 pieces of fluid passages 24a of the piston 24 and a discoid support portion 102 for supporting the throttle valve portions 101, and it is positioned and fixedly fitted in the piston 24 by bringing the support portion 102 into contact with the end wall 99 of the piston 24. Each throttle valve portion 101 has a curved cross sectional shape fitted to the inside surface of the piston 24, and it is continuous along the inside surface of the piston 24 like a band in parallel with the axis, and a small hole pierced for the position of the corresponding fluid passage 24a of the piston 24 is made the throttle passage 39, and it is flexibly supported like a cantilever by the support portion 102, and the throttle passage 39 is brought into contact with and is separated from the surface of the valve seat 40 of the corresponding piston 24. In the support portion 102, a central hole 102a into which the truncated conical projection 99a of the piston 24 goes is pierced at the center, and a notch 102b for the positioning exists in the periphery.

The operation of a master cylinder according to the above fifth embodiment will be described. When there is a flow of the hydraulic fluid to the reservoir 17 from the pressure generating chamber 26, the throttle valve portion 101 is brought into contact with the valve seat 40 by that flow, so that the hydraulic fluid in the pressure generating chamber 26 may flow to the reservoir 17 through the throttle passage 39 of the throttle valve portion 101. Accordingly, when starting to operate, the amount of the hydraulic fluid escaping to the reservoir 17 from the pressure generating chamber 26 is small. On the contrary, when there is a flow of the hydraulic fluid to the pressure generating chamber 26 from the reservoir 17, the throttle valve portion 101 is separated from the valve seat 40 by that flow, so that the hydraulic fluid in the reservoir 17 may flow into the pressure generating chamber 26 through the clearance between the valve seat 40 and the throttle valve portion 101. Accordingly, when returning, the hydraulic fluid in the reservoir 17 is supplemented to the pressure generating chamber 26 without resistance.

In the case of a master cylinder according to the fifth embodiment, it is sufficient to pierce a hole-shaped fluid passage 24a in the peripheral wall of the piston 24 and to fit the throttle valve member 100 into the piston 24, and therefore, the reduction of the number of pieces of parts, the reduction of the cost, and the improvement of assembling can be attained with a simple structure, and the length of the piston 24 does not become long, and it can be prevented from becoming large-sized, and further, when starting to operate, the amount of the hydraulic fluid escaping to the reservoir 17 accompanied with the advance of the piston 24 can be decreased, and the pedal stroke of the brake or the like can be shortened. Furthermore, when returning, the supplementation of the hydraulic fluid from the reservoir 17 to the pressure generating chamber 26 can smoothly be performed, and the returning response becomes good.

Figure 21:
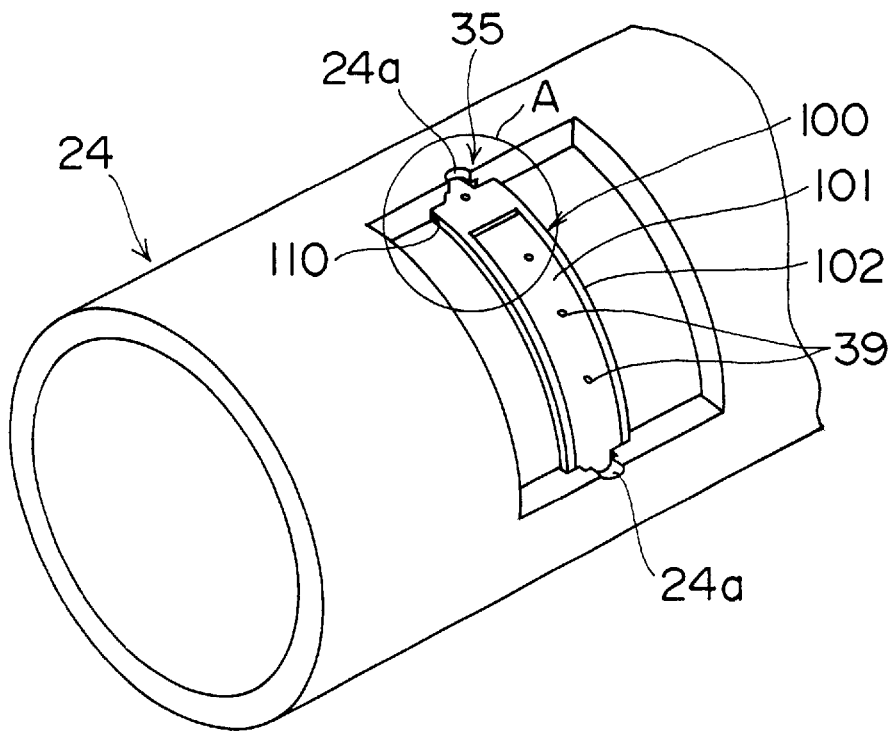
FIG. 21 is an illustration showing the partially broken essential portion of a modified example of a throttle valve mechanism according to a fifth embodiment of the present invention.
Figure 22:
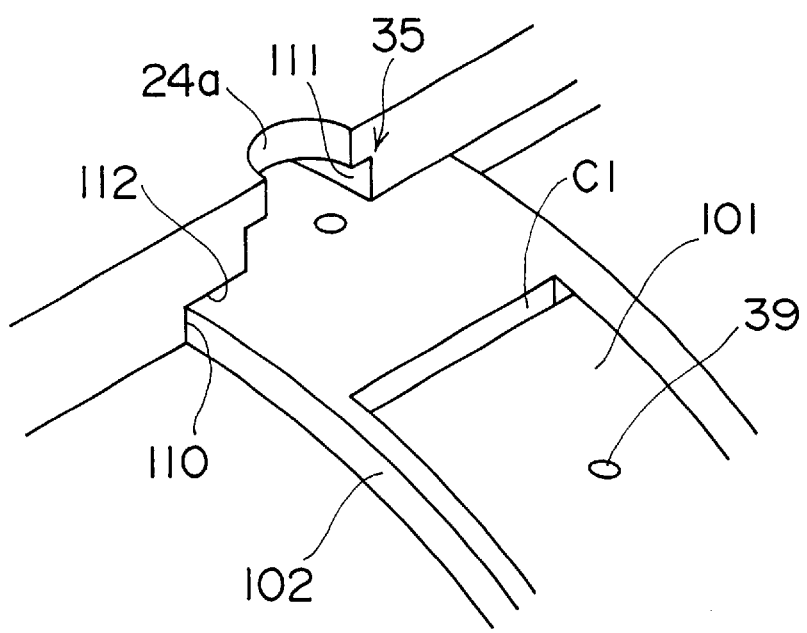
FIG. 22 is an enlarged illustration of the part in the circle A of FIG. 21.
Figure 23:
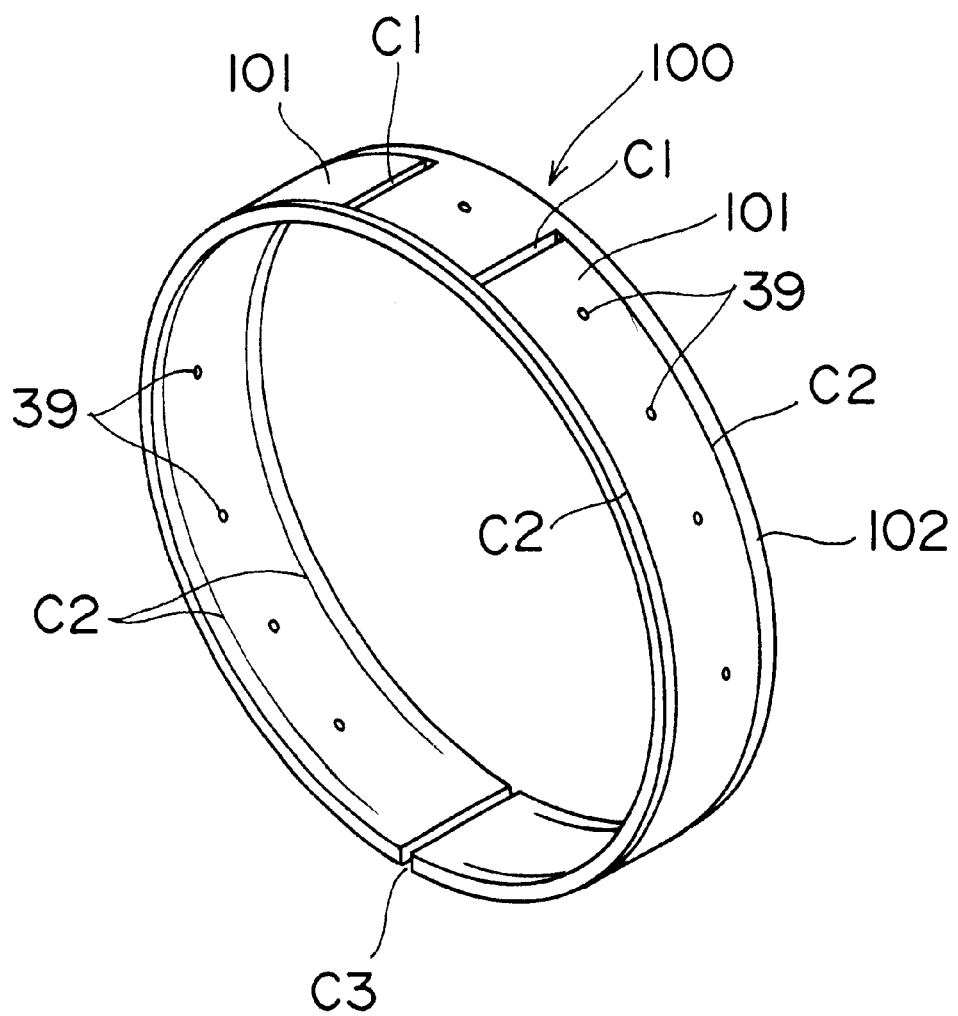
FIG. 23 is an illustration showing a throttle valve member of FIG. 21.

FIG. 21 is an illustration showing the essential part of a modified example of a throttle valve mechanism according to the fifth embodiment of the present invention, and FIG. 22 is a partial enlarged illustration thereof. The throttle valve mechanism 35 according to this modified example is constituted such that a support groove 110 is provided along the inner periphery of the piston 24 and a plurality of holes are pierced at some intervals in the circumferential direction in the position of the support groove 110 and these are made the fluid passage 24a and the circular throttle valve member 100 shown in FIG. 23 is fixedly fitted into the support groove 110. In the piston 24, a connecting groove 111 for connecting the support groove 110 and the fluid passage 24a is formed continuously in the circumferential direction with a width narrower than that of the support groove 110 with the valve seating face 112 between them.

FIG. 23 is an illustration showing a circular throttle valve member before being attached to the piston. This throttle valve member 100 is made from an elastic metal material or a synthetic resin material, and it integrally has a throttle valve portion 101 and a circular support portion 102, and it integrally has a band-shaped throttle valve portion 101 formed by making a notch in the width direction in the circular support portion 102, and a plurality of holes are pierced at some intervals in the circumferential direction, and these holes are the throttle passage 39.

In the throttle valve portion 101, notches C1 in the width direction along the width direction of a ring with a constant width, and notches C2, C2 in the circumferential direction which are continuous with both ends of the notches in the width direction are provided at 2 places so that 2 pieces may be symmetrically formed, and throttle passages 39 shaped like a small hole are pierced for the positions of the corresponding fluid passages 24a of the piston 24, and it is flexibly supported by the support portion 102 like a cantilever, and the throttle passages 39 are brought into contact with and are separated from the valve seating face 112 of the corresponding piston 24. In the support portion 102, a break C3 is provided in the circular material, and the diameter can be enlarged and reduced by elastic deformation, and in the state before being fitted in the piston 24, the outside diameter is a little larger than the inside diameter of the valve seating face 112, and it is fitted in the support groove 110 in the state of a reduced diameter, and it is fixedly fitted in the support groove 110 in the state of coming into contact with the valve seating face 112.

Figure 24:
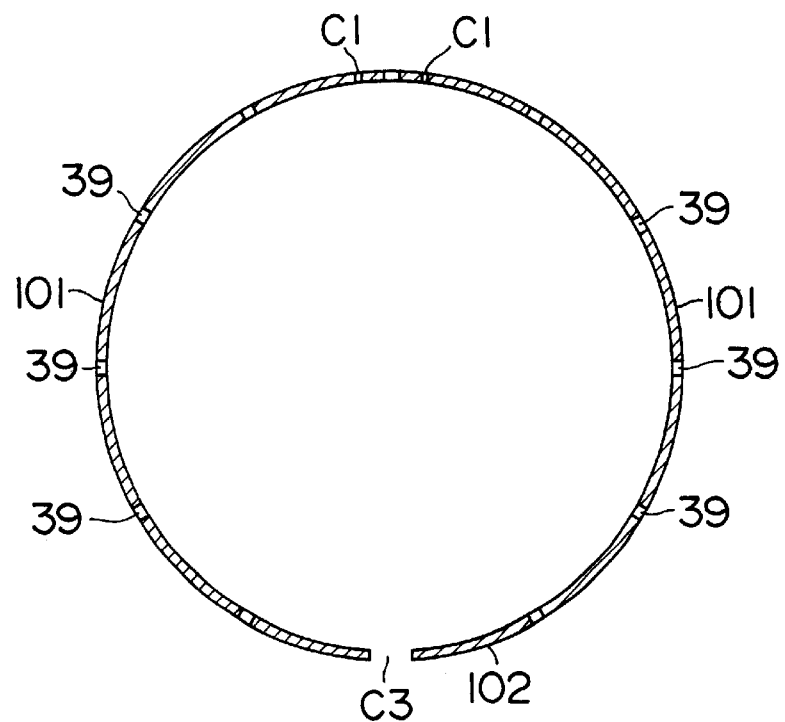
FIG. 24 is a front cross sectional view for the explanation of the operation of a throttle valve mechanism of FIG. 23.
Figure 25:
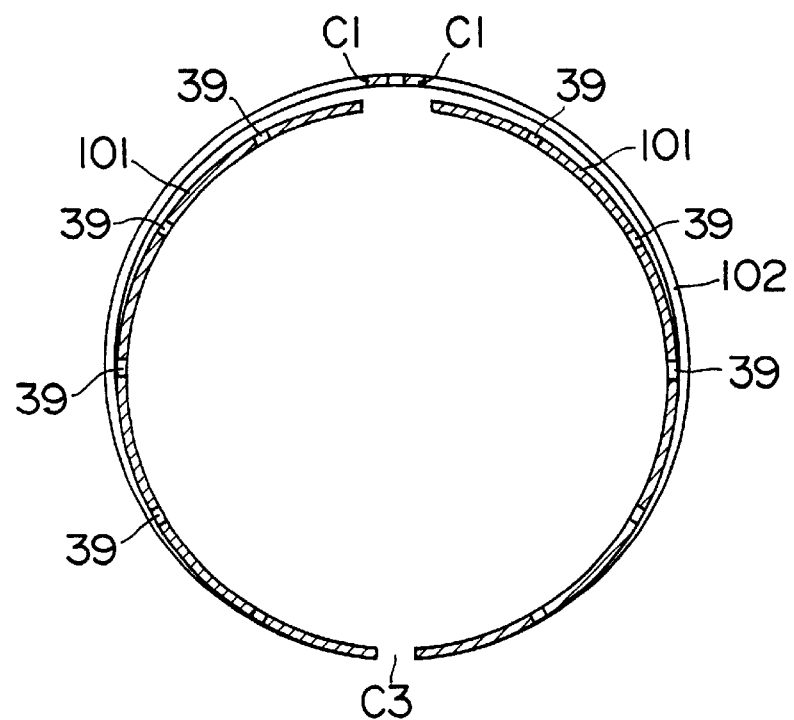
FIG. 25 is a front cross sectional view for the explanation of the operation of a throttle valve mechanism of FIG. 23.
Figure 26:
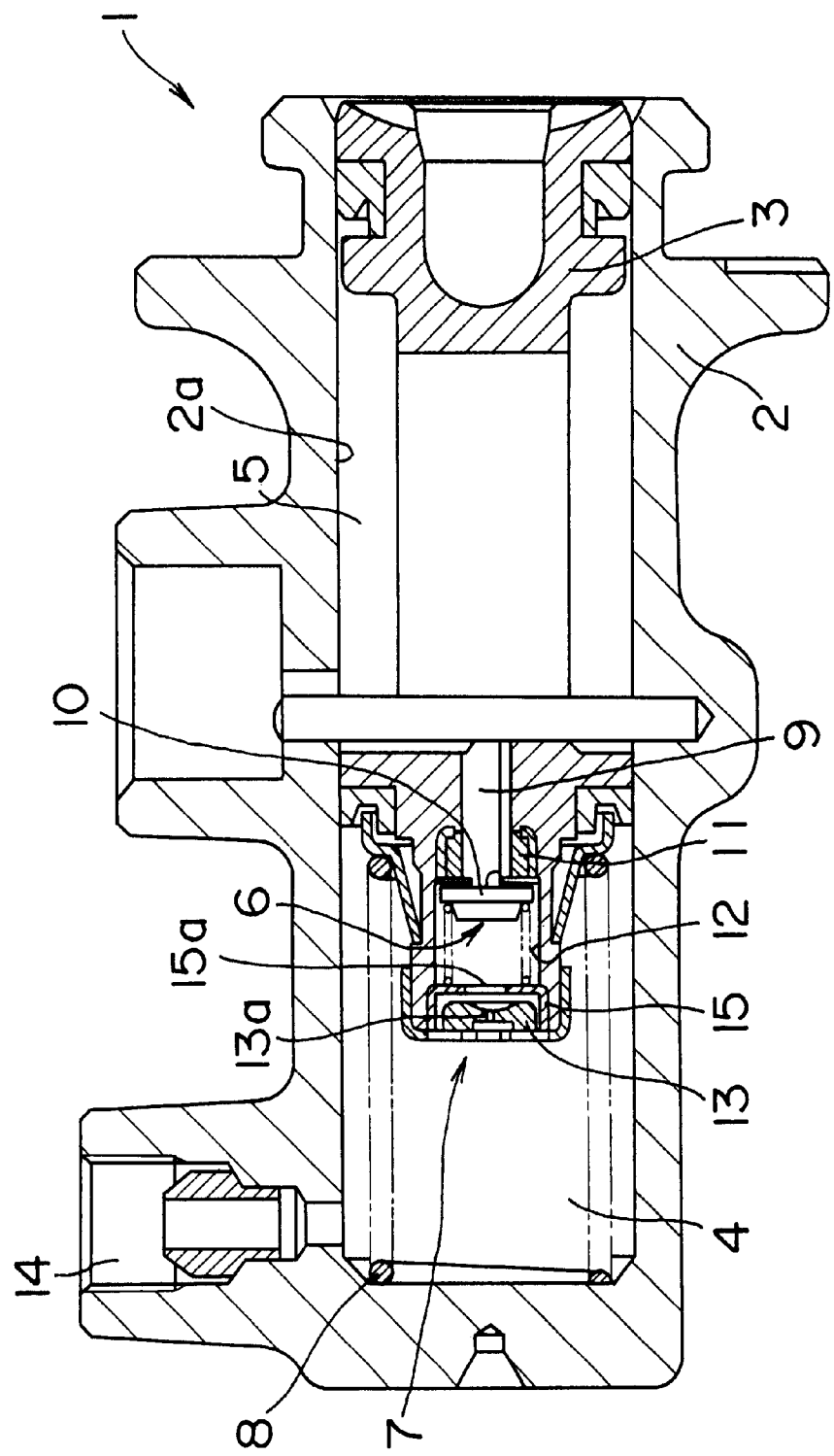
FIG. 26 is a vertical cross sectional view of a master cylinder related to the present invention.

The operation of a throttle valve mechanism of FIG. 23 will be described. When there is a flow of the hydraulic fluid to the reservoir 17 from the pressure generating chamber 26, the throttle valve portion 101 is overlapped on the support portion 102 by that flow in the front view, as shown in FIG. 24, and is brought into contact with the valve seating face 112, and the hydraulic fluid in the pressure generating chamber 26 flows to the reservoir 17 only through the throttle passage 39 of the throttle valve portion 101. Accordingly, when starting to operate, the amount of the hydraulic fluid escaping to the reservoir 17 from the pressure generating chamber 26 is small. On the contrary, when there is a flow of the hydraulic fluid to the pressure generating chamber 26 from the reservoir 17, the throttle valve portion 101 is bent inside and is separated from the valve seating face 112 by that flow as shown in FIG. 25, and the hydraulic fluid in the reservoir 17 flows into the pressure generating chamber 26 through the clearance between the valve seating face 112 and the throttle valve portion 101. Accordingly, when returning, the hydraulic fluid in the reservoir 17 is supplemented to the pressure generating chamber 26 without resistance.

By the way, the present invention is not decreased and reduced by the above embodiments, and various modifications are possible within the range where new matters are not added. For example, the throttle valve mechanisms 35, 36 described in the first embodiment can be applied to a master cylinder 19 of a form according to the second embodiment, and the throttle valve mechanism 36 described in the second embodiment to the fourth embodiment can similarly be provided in the course of the fluid passage for the supplementation of the hydraulic fluid which communicates with the primary pressure generating chamber 26, and the throttle valve mechanism 35 according to the fifth embodiment can also be applied to a master cylinder of any form. Furthermore, in the second embodiment to the fourth embodiment, it is preferable to enlarge the fluid passage 25a shaped like a small hole of the piston 25 as much as possible. Moreover, the present invention can naturally also be applied in the case of 1 piston.

Then, in the first embodiment shown in FIG. 1 and in the second embodiment shown in FIG. 16, the floating valve body 38 is separated from the valve seat 40 when not operating, and it is constituted to be brought into contact with the valve seat 40 by the flow of the hydraulic fluid, but it is also possible that the floating valve body 38 is made from a resin or the like with a specific gravity smaller than that of the hydraulic fluid to be brought into contact with the valve seat 40 when not operating. In this case, when starting to operate, the flow of the hydraulic fluid is throttled by the throttle hole 39 in the case when there is a flow of the hydraulic fluid to the reservoir 17 from the pressure generating chamber 26 or 27. On the contrary, at the time of returning operation or the like, in the case when the piston 24 or 25 retreats and the pressure in the pressure generating chamber 26 or 27 becomes lower than the pressure in the reservoir 17, the floating valve body 38 is separated from the valve seat 40 and the hydraulic fluid is not throttled and is supplemented to the pressure generating chamber 26 or 27 from the reservoir 17, in the case where there is a flow of the hydraulic fluid to the pressure generating chamber 26 or 27 from the reservoir 17.

What is claimed is:

1. A master cylinder comprising:

a cylinder body;

a piston which is slidably provided in a cylinder hole formed in the cylinder body;

a pressure generating chamber defined between said piston and said cylinder body;

a fluid passage which connects said pressure generating chamber to a reservoir for supplementing hydraulic fluid to said pressure generating chamber;

a cylindrical connecting portion that is integrally formed with said reservoir and is fitted within a connecting receiving portion of the cylinder body, with said cylindrical connecting portion including an end face that defines a valve seat, wherein said fluid passage extends at least through said cylindrical connecting portion;

an output port through which the hydraulic fluid is pumped from said pressure generating chamber when said piston operates;

a throttle passage formed in said fluid passage for throttling flow of the hydraulic fluid to the reservoir from said pressure generating chamber when said piston operates; and a throttle valve mechanism provided in said fluid passage for allowing hydraulic fluid to bypass said throttle passage and flow to said pressure generating chamber from said reservoir by opening a valve when a fluid pressure in said pressure generating chamber becomes lower than a pressure in said reservoir, said valve of said throttle valve mechanism including said valve seat and an at least generally plate-shaped, floating valve body, wherein said valve body moves into engagement with said valve seat in response to a flow of the hydraulic fluid that is caused by operation of said piston, and said valve body moves away from said valve seat in response to a flow of the hydraulic fluid that is caused by the fluid pressure in said pressure generating chamber becoming lower than the pressure in said reservoir.

2. The master cylinder according to claim 1, wherein said fluid passage for supplementing hydraulic fluid to said pressure generating chamber from said reservoir when said throttle valve mechanism opens said valve is formed in at least one of said throttle valve mechanism and said cylinder body.

3. The master cylinder according to claim 1, wherein said throttle passage is at least partially defined by said end face of said cylindrical connecting portion.

4. The master cylinder according to claim 3, wherein said throttle passage is provided in said fluid passage in parallel with said valve body.

5. The master cylinder according to claim 1, wherein said throttle passage is defined through said valve body.

6. The master cylinder according to claim 1, wherein said piston is a first piston, said pressure generating chamber is a first pressure generating chamber, said fluid passage is a first fluid passage, said cylindrical connecting portion is a first cylindrical connecting portion, said connecting receiving portion is a first connecting receiving portion, said end face is a first end face, said valve seat is a first valve seat, said output port is a first output port, said throttle passage is a first throttle passage, said throttle valve mechanism is a first throttle valve mechanism, said valve is a first valve, and said valve body is a first valve body, and wherein the master cylinder further includes:

a second piston which is slidably provided in said cylinder hole formed in the cylinder body;

a second pressure generating chamber defined between said second piston and said cylinder body;

a second fluid passage which connects said second pressure generating chamber to said reservoir for supplementing hydraulic fluid to said second pressure generating chamber;

a second cylindrical connecting portion that is integrally formed with said reservoir and is fitted within a second connecting receiving portion of the cylinder body, with said second cylindrical connecting portion including a second end face that defines a second valve seat, wherein said second fluid passage extends at least through said second cylindrical connecting portion;

a second output port through which the hydraulic fluid is pumped from said second pressure generating chamber when said second piston operates;

a second throttle passage formed in said second fluid passage for throttling flow of the hydraulic fluid to the reservoir from said second pressure generating chamber when said second piston operates; and a second throttle valve mechanism provided in said second fluid passage for allowing hydraulic fluid to bypass said second throttle passage and flow to said second pressure generating chamber from said reservoir by opening a second valve when a fluid pressure in said second pressure generating chamber becomes lower than a pressure in said reservoir, said second valve including said second valve seat and an at least generally plate-shaped, floating, second valve body, wherein said second valve body moves into engagement with said second valve seat in response to a flow of the hydraulic fluid that is caused by operation of said second piston, and said second valve body moves away from said second valve seat in response to a flow of the hydraulic fluid that is caused by the fluid pressure in said second pressure generating chamber becoming lower than the pressure in said reservoir.

7. A master cylinder according to claim 6, wherein said first throttle passage is defined through said first valve body, and said second throttle passage is defined through said second valve body.

8. The master cylinder according to claim 6, wherein said first fluid passage is formed in at least one of said first throttle valve mechanism and said cylinder body, and said second fluid passage is formed in at least one of said second throttle valve mechanism and said cylinder body.

9. The master cylinder according to claim 6, wherein said first throttle passage is at least partially defined by said first end face of said first cylindrical connecting portion, and said second throttle passage is at least partially defined by said second end face of said second cylindrical connecting portion.

10. The master cylinder according to claim 9, wherein said first throttle passage is provided in said first fluid passage in parallel with said first valve body, and said second throttle passage is provided in said second fluid passage in parallel with said second valve body.

* * * * *